United States Patent [19]

Wharton

[11] 3,824,411

[45] July 16, 1974

[54] PULSE DELAY CIRCUIT

[75] Inventor: James Hugh Wharton, Indianapolis, Ind.

[73] Assignee: RCA Corporation, New York, N.Y.

[22] Filed: July 2, 1973

[21] Appl. No.: 375,379

Related U.S. Application Data

[63] Continuation-in-part of Ser. No. 264,363, June 19, 1972, abandoned.

[52] U.S. Cl. .................... 307/262, 307/268, 328/55

[51] Int. Cl. ........................ H03k 1/12, H03k 5/159

[58] Field of Search ....... 307/262, 268, 293; 328/55

[56] References Cited

UNITED STATES PATENTS

| | | | |
|---|---|---|---|
| 3,007,060 | 10/1961 | Guenther | 307/293 X |
| 3,104,331 | 9/1963 | Zinke | 307/263 X |
| 3,244,907 | 4/1966 | Daigle, Jr. | 307/228 X |
| 3,297,883 | 1/1967 | Schulmeyer et al. | 307/228 |

*Primary Examiner*—John Zazworsky

*Attorney, Agent, or Firm*—Eugene M. Whitacre; Charles I. Brodsky

[57] ABSTRACT

A delay circuit for delaying a pulse or a series of pulses of different widths. The circuit delays the leading and trailing edges of an input pulse for respective first and second time delays. The delay of the trailing edge of the input pulse is not dependent upon the width of the input pulse, thus allowing pulses of different widths to pass through the delay circuit and have their respective leading and trailing edges delayed.

6 Claims, 5 Drawing Figures

PULSE DELAY CIRCUIT

Figure 1:
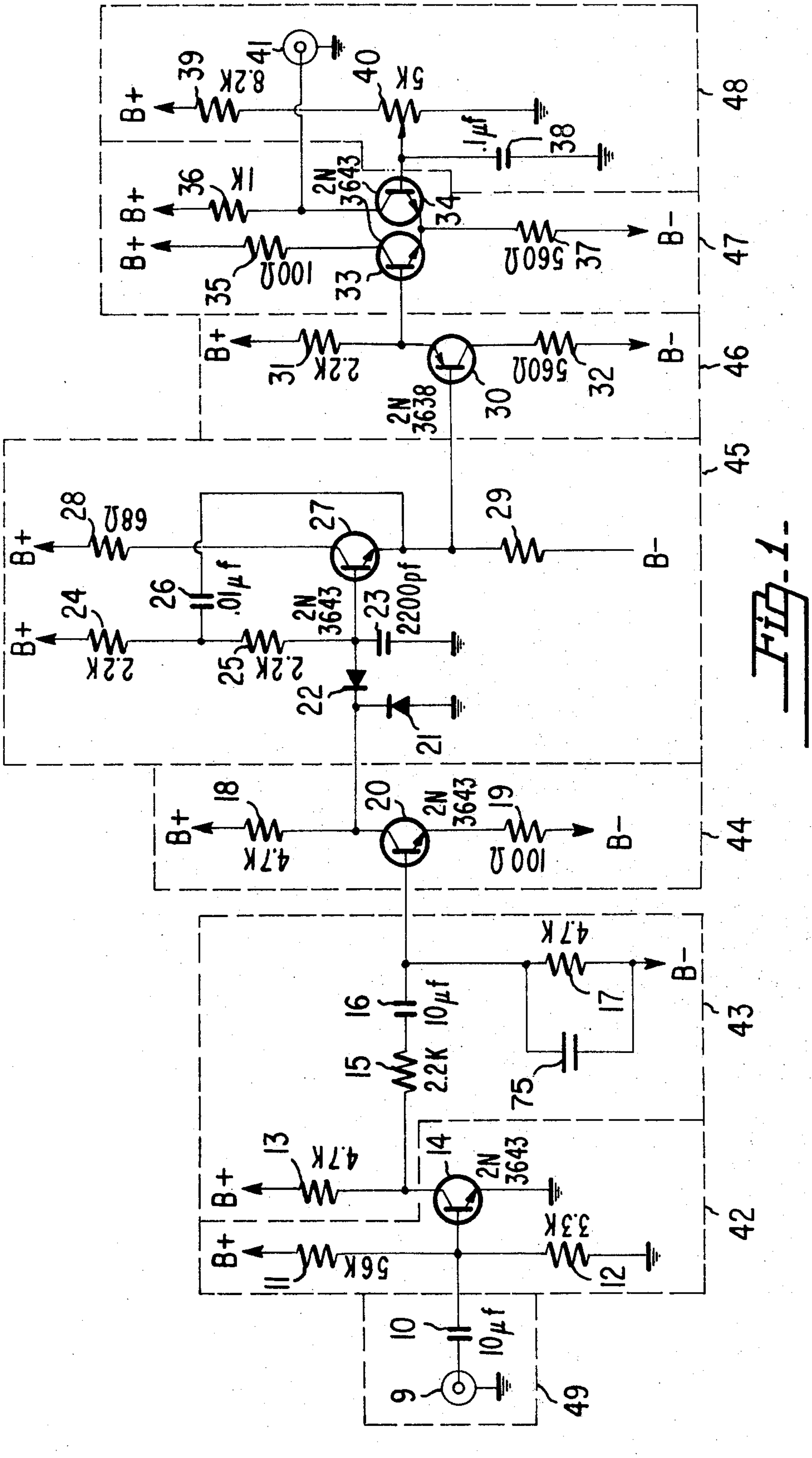

This is a continuation-in-part of application Ser. No. 264,363, filed June 19, 1972, and now abandoned.

BACKGROUND OF THE INVENTION

This invention relates to delay circuits and more particularly relates to circuits for delaying both the leading and trailing edges of one pulse or a series of pulses that may have different widths.

In a system in which timing pulses are associated with a video information signal that has been delayed by video processing circuitry, a delay circuit is needed to delay the timing pulses so they are in a proper time relationship with the video information. Such a circuit is useful, for example, in color encoding camera systems. In such a system, the unprocessed video signal is comprised of encoded color information obtained from the output terminal of the image pickup device. The timing information is comprised of a composite blanking signal generated by a synchronizing generator. The color information undergoes circuit processing to decode the color information to produce video signals representative of the color and luminance of the scene projected upon the color camera. This processing circuitry delays the processed video signal with respect to the horizontal and vertical blanking pulses. Since the horizontal and vertical pulses are of different widths, there is a need to provide a circuit which delays the timing pulses to provide pulses which are in the correct time relationship with the video information. The circuit should be capable of delaying the leading and trailing edges of the pulse independently of the pulse width.

One type of prior delay circuit used multivibrators to delay the trailing edges of a pulse but these were unsatisfactory since the delay time was dependent upon the base-to-emitter junction voltage of transistors in the multivibrator circuit which changed with temperature, thereby changing the amount of delay.

Other delay systems employed variable delay lines but these were expensive and therefore not particularly appealing for use in a consumer product.

When two multivibrators were used, one to delay the leading edge and one to delay the trailing edge, additional circuitry was necessary to combine the delayed pulse components to form a single delayed pulse. Also these discrete delay devices sometimes distorted the desired rectangular shape of the rectangular pulses necessitating the need for additional pulse shaping circuitry.

SUMMARY OF THE INVENTION

This invention is a pulse delay circuit for delaying the leading and trailing edges of a pulse. The circuit includes an input circuit for receiving an input pulse and a leading edge delay means coupled to the input circuit for delaying the leading edge of the input pulse. The circuit also includes a trailing edge delay means coupled to the leading edge delay means for delaying the trailing edge of the input pulse. The trailing edge delay means is responsive to both the delayed leading edge of the input pulse signals and the trailing edge of the input pulse. The trailing edge delay means includes means for producing a delayed output pulse, the leading edge of which is determined by the leading edge delay means and the width of which is determined by the trailing edge of the input pulse.

A more detailed description of the invention is given in the following specification and accompanying drawings of which:

FIG. 1 is a diagram of a pulse delay circuit embodying the invention; and

FIGS. *2a–2d* are waveforms illustrating the voltages at different points within the circuit shown in FIG. 1.

DESCRIPTION OF THE INVENTION

FIG. 1 is a diagram of a pulse delay circuit embodying the invention.

An input circuit 49 for receiving the input pulse signal is comprised of an input terminal 9 coupled to a capacitor 10. An inverting circuit 42, coupled to capacitor 10 is comprised of transistor 14 and resistors 11 and 12. Transistor 14 has a base bias voltage supplied by resistors 11 and 12 coupled between a positive voltage supply B+ and ground, the junction of resistors 11 and 12 forming a common terminal with the base of transistor 14 and capacitor 10.

A timing circuit 43 is coupled to the collector of transistor 14 and is comprised of resistor 13, resistor 15 in series with capacitor 16, and resistor 17 coupled between capacitor 16 and a negative voltage supply B−. Resistor 13 is coupled between the positive voltage supply B+ and resistor 15, the junction of resistor 13 and resistor 15 being coupled to the collector terminal of transistor 14. A further capacitor 75 is coupled across resistor 17.

A switching circuit 44 is coupled to timing circuit 43 and is comprised of a transistor 20 and resistors 18 and 19. The base of transistor 20 is coupled to the junction of capacitor 16 and resistor 17. The emitter terminal of transistor 20 is connected to resistor 19. Resistor 18 is coupled between the collector terminal of transistor 20 and the positive voltage supply B+.

A control voltage generating means 45 is coupled to the collector of transistor 20 and is comprised of diodes 21 and 22, series resistors 24 and 25, capacitor 23, transistor 27, feedback capacitor 26, collector resistor 28, and emitter resistor 29. The cathode of diodes 21 and 22 are coupled to the collector of transistor 20. The anode of diode 21 is coupled to ground. The anode of diode 22 forms a junction with resistor 25 and capacitor 23 with the base of transistor 27. Feedback capacitor 26 is coupled between the emitter of transistor 27 and the junction of resistors 25 and 24. Resistor 24 is coupled between resistor 25 and the positive voltage supply B+ and resistor 28 is coupled between the positive voltage supply B+ and the collector of transistor 27. Capacitor 23 is coupled between ground and the junction of resistor 25, diode 22, and the base electrode of transistor 27. Resistor 29 is coupled between the emitter of transistor 27 and the minus voltage supply B+.

An emitter follower stage 46 coupled to the control voltage generating means 45 is comprised of transistor 30, resistor 32 and resistor 31. The base of transistor 30 is coupled to the junction between resistor 29 and the emitter of transistor 27. Resistor 30 is coupled between a positive voltage supply B+ and the emitter of transistor 30. Resistor 32 is coupled between a minus voltage supply B− and the collector of transistor 30.

A comparing circuit 47, coupled to emitter follower stage 46, is comprised of balanced transistors 33 and 34, resistors 35, 36 and 37. The base of transistor 33 is coupled to the junction of resistor 31 and the emitter of transistor 30. Resistor 35 is coupled between the positive voltage supply B+ and the collector of transistor 33. Resistor 36 is coupled between the positive voltage supply B+ and the collector of transistor 34. Resistor 37 is coupled between a minus voltage supply B− and a common emitter junction of transistors 33 and 34.

A reference voltage generating circuit 48, coupled to the base of transistor 34, is comprised of capacitor 38, potentiometer 40 and resistor 39. Resistor 39 and potentiometer 40 are serially coupled between a positive voltage supply B+ and ground with the center tap of potentiometer 40 being coupled to the base of transistor 34. Capacitor 38 is coupled between the base of transistor 34 and ground. An output terminal 41 is coupled between the collector of transistor 34 and resistor 36. Lastly, all transistors are shown of N-P-N type, except for the P-N-P transistor 30.

Figures 2A, 2B, 2C, 2D:
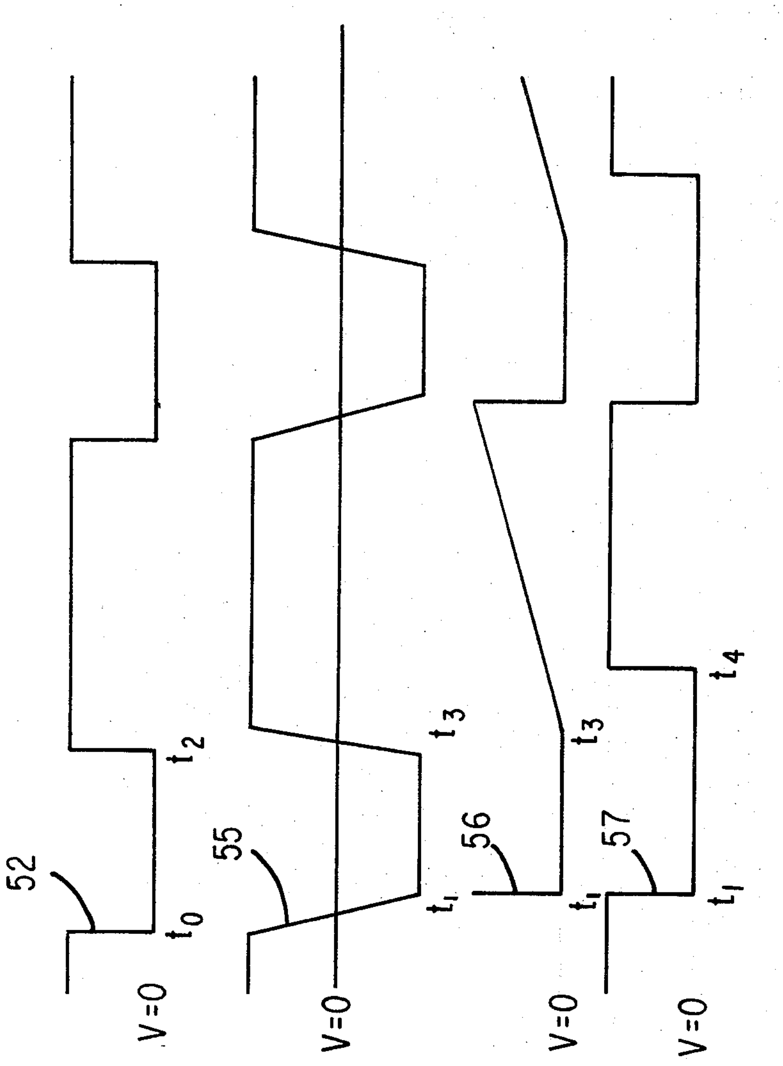

Operation of the above-described delay circuit can best be described by assuming that a pulse, having the shape of the waveform 52 shown in FIG. 2*a*, is coupled to the input circuit 49 at input terminal 9 of FIG. 1. The pulse has a leading edge which starts at time $t_0$ and a trailing edge which starts at time $t_2$, the width of the pulse being $t_2 - t_0$. As the pulse enters the circuit through input terminal 9, it is inverted by transistor 14. Transistor 14 is switched to the off position by the negative leading edge of the input pulse. When transistor 14 is in the off position, capacitor 16 charges through resistors 13, 15 and 17, the latter resistor being coupled in parallel connection by the capacitor 75. As capacitor 16 is charging, the voltage at the base of transistor 20 rises eventually to turn transistor 20 on at time $t_1$, indicated in FIG. 2*b*, thereby delaying the leading edge of the input pulse by a time $t_1 - t_0$. The voltage appearing at the collector of transistor 20 is shown as waveform 55 in FIG. 2*b*.

At time $t_2$, the trailing edge of the input pulse turns on transistor 14 thereby providing a discharge path for capacitor 16 through transistor 14 to ground, bypassing resistor 13 which was in the charge path of capacitor 16. The turning off of transistor 20 is delayed until the voltage on capacitor 16 discharges to a point where forward bias of transistor 20 is no longer maintained. This delays the trailing edge of the input pulse by a time of $t_3 - t_2$. The trailing edge delay is less than the leading edge delay since the effective resistance in the discharge path is less than the resistance in the charging path of capacitor 16.

When transistor 20 is turned on, by action of the leading edge of the input pulse, any voltage stored in capacitor 23 is allowed to discharge through diode 22, transistor 20 and resistor 19. When capacitor 23 is fully discharged, the base of N-P-N transistor 27 is approximately at ground potential causing the emitter of transistor 27 to be below ground potential due to the base-emitter junction voltage drop. The emitter of P-N-P transistor 30 is at a higher potential than emitter of transistor 27, due to its base-emitter junction voltage drop of opposite polarity. Therefore, the voltage at the emitter of transistor 30 is very close to the voltage at the base of transistor 27. Transistor 33 has its emitter held above ground potential by transistor 34 and resistors 39 and 40. Transistor 33 is, therefore, off while transistor 34 is, therefore, on. This condition exists after transistor 20 is rendered conductive.

When transistor 20 is being turned on, however, by the leading edge of the pulse, transistor 27 is made to be non-conductive by the resulting decrease in voltage at its base electrode. P-N-P transistor 30 conducts by the potential applied from the B− supply through resistor 29, and the voltage at the emitter of transistor 30 is close to the B− voltage supply, thereby turning off transistor 33 which turns on transistor 34. When transistor 34 is being turned on, the collector of transistor 34 drops in voltage producing the delayed leading edge of the output pulse; thereafter the operation described in the previous paragraph occurs.

When transistor 20 is being turned to an off state, by action of the trailing edge of the input pulse, the junction of diodes 21, 22 and the collector of transistor 20 rises in voltage allowing capacitor 23 to charge through resistors 24 and 25. As the voltage across capacitor 23 increases the base of transistor 27 increases, producing a corresponding rise in voltage at the emitter of transistor 27. The voltage that is supplied by the charging capacitor 23 at the base of transistor 27 is linearized by feedback capacitor 26. Waveform 56 of FIG. 2*c* illustrates the voltage appearing at the bases of transistors 27 and 30. The voltage appearing at the base of transistor 27 also appears at the base of transistor 33 due to the emitter follower action provided by transistors 27 and 30. P-N-P transistor 30 in emitter follower stage 46 provides temperature compensation for the output signal of the control voltage generating means at the emitter of N-P-N transistor 27 because its base-emitter drop is equal and opposite to the base emitter drop of transistor 27. As the voltage rises at the base of transistor 33, it will continue to rise until it forward biases the base-emitter junction of transistor 33 at time $t_4$. The voltage appearing at the emitter of transistor 33 is determined by the voltage applied to the base of transistor 34. This is the reference voltage and it is controlled by the setting of potentiometer 40. When the voltage at the base of transistor 33 equals the reference voltage, transistor 33 will turn on. Since transistors 33 and 34 have common emitters and are a balanced circuit, transistor 34 will turn off when transistor 33 turns on. When transistor 34 turns off its collector will produce the trailing edge of the output pulse. The delayed output pulse signal is obtained at the collector of transistor 34. The voltage appearing at the collector of transistor 34 is shown as waveform 57 in FIG. 2*d*.

The above-described invention provides a circuit where the leading edge of an input pulse is delayed by a set period of time. This leading edge delay can be varied by varying either the resistance 15 or the capacitance 16. The delayed leading edge appears at output terminal 41 to provide the leading edge of the output delayed pulse.

The trailing edge of the output delayed pulse is determined by three factors: the trailing edge of the input pulse; the discharge path of capacitor 16; and the reference voltage set at potentiometer 40. The trailing edge of the input pulse is delayed by the discharge of capacitor 16. The delayed trailing edge of the input pulse initiates the charging cycle of capacitor 23, and the delayed trailing edge of the output pulse is determined when the voltage produced at capacitor 23 equals the reference voltage produced at the base of transistor 34. Therefore, the reference voltage determines the amount of delay applied to the trailing edge of the output pulse while the trailing edge of the input pulse determines when this delay is initiated. Pulses of varying widths can enter the delay circuit and the leading and trailing edges of each pulse will be delayed equally.

What is claimed is:

1. A pulse delay circuit for delaying the leading and trailing edges of an input pulse, said circuit comprising:

an input circuit for receiving said input pulse;
input pulse delay means coupled to said input circuit for delaying the leading and trailing edges of said input pulse; and
means coupled to said input pulse delay means for producing an output pulse at an output terminal, the leading edge of said output pulse corresponding in time to said delayed leading edge of said input pulse, the trailing edge of said output pulse determined by means including;
a control signal generating circuit responsive to said delayed trailing edge of said input pulse for producing a control signal whose voltage changes with time; and
a comparing circuit including a reference voltage coupled to said control signal generating circuit for producing said trailing edge of said output pulse when said control signal exceeds said reference voltage.

2. A pulse delay circuit as described in claim 1 wherein said comparing circuit includes a differential amplifier circuit that switches from a first state to a second state when said delayed leading edge of said input pulse is present and from said second state to said first state when said control signal approximately equals said reference voltage.

3. A pulse delay circuit as described in claim 1 wherein said input pulse delay means includes:
a first timing circuit responsive to said leading edge of said input pulse coupled to said input circuit having a first charging path for producing a first time delay voltage;
a first switching circuit coupled to said timing circuit and responsive to said first time delay voltage for producing said delayed leading edge of said input pulse; and
a second timing circuit responsive to said trailing edge of said input pulse coupled to said input circuit and said first switching circuit having a first discharging path for producing a second time delay voltage, said first switching circuit responsive to said second time delay voltage for producing said delayed trailing edge of said input pulse.

4. A pulse delay circuit as described in claim 3 wherein said control signal generating circuit includes means for providing a first current path when said first switching circuit is operative for producing said delayed leading edge of said input pulse and for providing a second current path when said first switching circuit is operative for producing said delayed trailing edge of said pulse.

5. A pulse delay circuit as described in claim 4 wherein said control signal generating circuit includes a sawtooth generating circuit for producing a sawtooth control signal which is initiated by said delayed trailing edge of said input pulse.

6. A television blanking circuit for delaying the leading and trailing edges of an input pulse, said circuit comprising:
an input circuit for receiving said input pulse;
input pulse delay means coupled to said input circuit for delaying the leading and trailing edges of said input pulse, said input pulse delay means comprising;
a first timing circuit responsive to said leading edge of said input pulse coupled to said input circuit and having a first charging path for producing a first time delay voltage;
a first switching circuit coupled to said timing circuit and responsive to said first time delay voltage for producing said delayed leading edge of said input pulse; and
a second timing circuit responsive to said trailing edge of said input pulse coupled to said input circuit and said first switching circuit and having a first discharge path for producing a second time delay voltage, said first switching circuit responsive to said second time delay voltage for producing said delayed trailing edge of said input pulse;

means coupled to said input pulse delay means for producing an output pulse at an output terminal, the leading edge of said output pulse corresponding in time to said delayed leading edge of said input pulse, the trailing edge of said output pulse determined by means including;
a control signal generating circuit responsive to said delayed trailing edge of said input pulse for producing a control sawtooth signal;
a comparing circuit coupled to said control signal generating circuit including a reference voltage and differential amplifier circuit for producing said trailing edge of said output pulse when said control signal exceeds said reference voltage, said differential amplifier circuit switching from a first state to a second state when said delayed leading edge of said input pulse is present; and
said control signal generating circuit including first and second diodes whose cathodes are coupled together and are coupled to said first switching circuit for providing a first current path when said first switching circuit is in a third state and a second current path when said first switching circuit is in a fourth state.

* * * * *